(12) United States Patent
Haldar et al.

(10) Patent No.: US 12,512,089 B2
(45) Date of Patent: Dec. 30, 2025

(54) TESTING CASCADED DEEP LEARNING PIPELINES COMPRISING A SPEECH-TO-TEXT MODEL AND A TEXT INTENT CLASSIFIER

(71) Applicant: International Business Machines Corporation, Armonk, NY (US)

(72) Inventors: Swagatam Haldar, Kolkata (IN);
Diptikalyan Saha, Bangalore (IN);
Deepak Vijaykeerthy, Bangalore (IN);
Aniya Aggarwal, New Delhi (IN);
Nishtha Madaan, Gurgaon (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 425 days.

(21) Appl. No.: 18/062,857

(22) Filed: Dec. 7, 2022

(65) Prior Publication Data

US 2024/0194184 A1    Jun. 13, 2024

(51) Int. Cl.
*G10L 15/01* (2013.01)
*G06N 3/08* (2023.01)
(Continued)

(52) U.S. Cl.
CPC ............ *G10L 15/01* (2013.01); *G06N 3/08* (2013.01); *G10L 15/1815* (2013.01); *G10L 15/32* (2013.01); *G10L 25/18* (2013.01)

(58) Field of Classification Search
CPC ....... G10L 15/01; G10L 15/063; G10L 15/16; G10L 15/1815; G10L 15/22; G10L 15/23;
(Continued)

(56) References Cited

U.S. PATENT DOCUMENTS

2015/0199959 A1\* 7/2015 Skoglund ............... G10L 25/60
704/239
2017/0270946 A1\* 9/2017 Kaniewska ............ G10L 25/93
(Continued)

OTHER PUBLICATIONS

Neekhara, et al., "Universal Adversarial Perturbations for Speech Recognition Systems," Interspeech Sep. 15-19, 2019, 2019, Graz, Austria, DOI: 10.21437/Interspeech.2019-1353.
(Continued)

*Primary Examiner* — Andrew C Flanders
(74) *Attorney, Agent, or Firm* — Amin, Turocy & Watson, LLP

(57) ABSTRACT

One or more systems, devices, computer program products and/or computer-implemented methods of use provided herein relate to a process to facilitate testing a cascaded pipeline. A system can comprise a memory that stores computer executable components, and a processor that executes the computer executable components stored in the memory, wherein the computer executable components can comprise an input component, a cascaded pipeline, and an evaluation component. The input component can receive a test case associated with a label from labeled speech data represented by waveform. The evaluation component can feed the test case to the cascaded pipeline to obtain an output of the cascaded pipeline. The evaluation component can evaluate a robustness of the cascaded pipeline by comparing the output of the cascaded pipeline and the label. The cascaded pipeline can include a first model and a second model, and the first model can be different than the second model.

20 Claims, 8 Drawing Sheets

(51) Int. Cl.
   *G10L 15/18*    (2013.01)
   *G10L 15/32*    (2013.01)
   *G10L 25/18*    (2013.01)

(58) Field of Classification Search
   CPC ......... G10L 25/00; G10L 25/18; G10L 25/60; G10L 25/69; G10L 15/32; G11B 20/18–1889; G11B 2020/1823–1896; G06F 40/285; G06F 40/30; G06N 3/044; G06N 3/045; G06N 3/08; G06N 3/084; G06N 20/00
   See application file for complete search history.

(56) References Cited

U.S. PATENT DOCUMENTS

| | | | |
|---|---|---|---|
| 2021/0043186 A1* | 2/2021 | Nagano | G10L 15/063 |
| 2021/0304733 A1* | 9/2021 | Jalaluddin | G10L 15/26 |
| 2021/0352406 A1* | 11/2021 | Sharma | G10L 25/78 |
| 2022/0262357 A1* | 8/2022 | Naylor | G10L 21/0224 |
| 2025/0140263 A1* | 5/2025 | Castan Lavilla | G10L 17/04 |
| 2025/0140281 A1* | 5/2025 | Biswas | G06N 3/0499 |

OTHER PUBLICATIONS

Xie, et al., "Real-Time, Universal, and Robust Adversarial Attacks Against Speaker Recognition Systems," Journal of Signal Processing Systems vol. 93, pp. 1187-1200 (2021), https://doi.org/10.1007/s11265-020-01629-9.

Huang, et al., "Leveraging Unpaired Text Data for Training End-To-End Speech-to-Intent Systems," Published May 1, 2020, ICASSP 2020—2020 IEEE International Conference on Acoustics, Speech and Signal Processing (ICASSP), DOI:10.1109/ICASSP40776.2020.9053281.

Uddin, "Testing Machine Learning Pipelines," Mar. 30, 2021, https://towardsdatascience.com/testing-machine-learning-pipelines-22e59d7b5b56.

Iranzo-Sánchez, et al., "Streaming cascade-based speech translation leveraged by a direct segmentation model," Neural Networks 142 (2021) 303-315, Available online May 17, 2021, https://doi.org/10.1016/j.neunet.2021.05.013.

Hilmi, et al., "CrossASR: Efficient Differential Testing of Automatic Speech Recognition via Text-To-Speech," 2020 IEEE International Conference on Software Maintenance and Evolution (ICSME), Sep. 28, 2020 to Oct. 2, 2020. Adelaide, Australia, DOI 10.1109/ICSME46990.2020.00066.

Carlini, et al., "Audio Adversarial Examples: Targeted Attacks on Speech-to-Text," arXiv:1801.01944v2 [cs.LG] Mar. 30, 2018, https://doi.org/10.48550/arXiv.1801.01944.

Morris, et al., "TextAttack: A Framework for Adversarial Attacks, Data Augmentation, and Adversarial Training in NLP," arXiv:2005.05909v4 [cs.CL] Oct. 5, 2020, https://doi.org/10.48550/arXiv.2005.05909.

Qin, et al., "Imperceptible, Robust, and Targeted Adversarial Examples for Automatic Speech Recognition," Proceedings of the 36th International Conference on Machine Learning, Long Beach, California, PMLR 97, Jun. 9-15, 2019, http://proceedings.mlr.press/v97/qin19a/qin19a.pdf.

Bhambri, et al., "A Survey of Black-Box Adversarial Attacks on Computer Vision Models," arXiv:1912.01667v3 [cs.LG] Feb. 7, 2020, https://doi.org/10.48550/arXiv.1912.01667.

Prenger, et al., "Waveglow: A flow-based generative network for Speech Synthesis," arXiv:1811.00002v1 [cs.SD] Oct. 31, 2018, https://doi.org/10.48550/arXiv.1811.00002.

Koerich, et al., "Cross-Representation Transferability of Adversarial Attacks: From Spectrograms to Audio Waveforms," arXiv:1910.10106v4 [cs.SD] Jul. 29, 2020, https://doi.org/10.48550/arXiv.1910.10106.

* cited by examiner

```
OBJ-FUNC(x, y, δ)
    δ' = UPSAMPLE(δ)
    δ' = PROJECTION(δ') // Projecting perturbation
                        on l_p-ball around x
    RETURN l(g(m(x) + δ); θ); φ)

procedure BAYES-ATTACK(x_0, y_0)
    D = {(δ_1, o_1), ..., (δ_n_0, o_n_0)}    ▷ Querying randomly chosen n_0 points.
    Update the GP on D                        ▷ Updating posterior distribution using available points
    t ← n_0                                   ▷ Updating number of queries till now
    while t ≤ T do
        δ_t ← arg max_δ A(δ | D)              ▷ Optimizing the acquisition function over the GP
        o_t ← OBJ-FUNC(x_0, y_0, δ)           ▷ Querying the model
        t ← t + 1
        if o_t ≤ 0 then
            D ← D ∪ (δ_t, o_t) and update the GP  ▷ Updating posterior distribution
            return δ_t                            ▷ Adversarial attack successful
        else
            return δ_t                            ▷ Adversarial attack unsuccessful
```

FIG. 6

TESTING CASCADED DEEP LEARNING PIPELINES COMPRISING A SPEECH-TO-TEXT MODEL AND A TEXT INTENT CLASSIFIER

BACKGROUND

One or more embodiments described herein relate generally to testing and evaluating a cascaded deep learning pipeline by generating perturbed forms of the original input waveform. Embodiments relate to perturbing waveforms received by the system by viewing the Speech-to-text (S2T) model and the Text Intent Classifier (TIC) as a single cascaded pipeline, and more specifically, to systems and methods to facilitate evaluating the robustness of a cascaded deep learning pipeline.

SUMMARY

The following presents a summary to provide a basic understanding of one or more embodiments described herein. This summary is not intended to identify key or critical elements or delineate any scope of the particular embodiments or any scope of the claims. The sole purpose of the summary is to present concepts in a simplified form as a prelude to the more detailed description that is presented later. In one or more embodiments described herein, systems, devices, computer-implemented methods, and/or computer program products that facilitate testing cascaded deep learning pipelines comprising a S2T model and a TIC are described.

According to an embodiment, a system can comprise a memory that stores computer executable components and a processor that executes the computer executable components stored in the memory. The computer executable components can include an input component, a cascaded pipeline, and an evaluation component. The input component can receive a test case associated with a label from labeled speech data represented by waveform. Additionally, the evaluation component can feed the test case to the cascaded pipeline to obtain an output of the cascaded pipeline. Further, the evaluation component can evaluate a robustness of the cascaded pipeline by comparing the output of the cascaded pipeline and the label.

According to another embodiment, a computer-implemented method of testing the robustness of a cascaded pipeline, can comprise generating, using a processor operatively coupled to memory, a test case associated with a label from labeled speech data represented by waveform. Additionally, the computer-implemented method can include feeding, using the processor, the test case to a cascaded pipeline to obtain an output. Further, the method can include testing, using the processor, a robustness of the cascaded pipeline by comparing the output of the cascaded pipeline and the label.

According to yet another embodiment, a computer program product for testing the robustness of a cascaded pipeline, the computer program product can comprise a computer readable storage medium having program instructions embodied therewith, the program instructions executable by a processor can cause the processor to generate a test case associated with a label from labeled speech data represented by waveform. The computer program product can feed, using the processor, the test case to a cascaded pipeline to obtain an output. Additionally, the computer program product can test, using the processor, a robustness of the cascaded pipeline by comparing the output of the cascaded pipeline and the label.

DESCRIPTION OF THE DRAWINGS

FIG. 6 illustrates a portion of a perturbing algorithm that can be utilized by the non-limiting cascaded deep learning pipeline, in accordance with one or more embodiments described herein.

DETAILED DESCRIPTION

Figure 1:
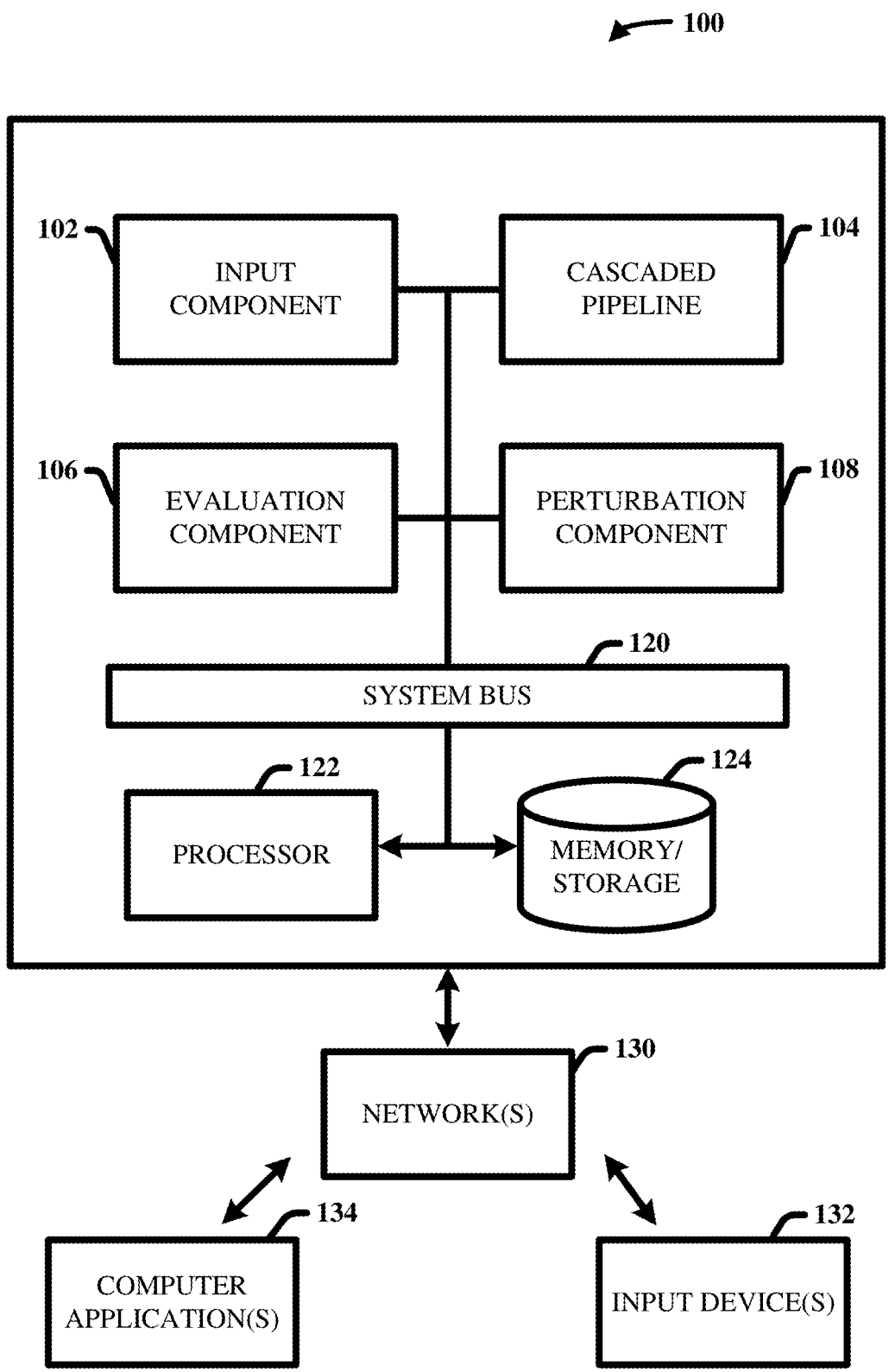
FIG. 1 illustrates a block diagram of an example, non-limiting cascaded deep learning pipeline testing system, in accordance with one or more embodiments described herein.

The following detailed description is merely illustrative and is not intended to limit embodiments or application or uses of embodiments. Furthermore, there is no intention to be bound by any expressed or implied information presented in the preceding Background or Summary sections, or in this Detailed Description section.

Deep Learning (DL) and Machine Learning (ML) models are increasingly being used for one or more of a variety of tasks. For example, and without limitation, such tasks can include transcription, interpretation, and/or classification of parts of speech for further processing and analysis. Deep learning and machine learning models can be expected to provide a decisive outcome and, additionally, the predictive performance of the deep learning or machine learning model can be tested on a reserve test set. For example and without limitation, such deep learning and machine learning models can comprise any number of one or more Speech-to-text (S2T) models and Text Intent Classifiers (TIC).

In some instances, the trained deep learning and machine learning models can fail to produce correct outcomes. In other words, the deep learning and machine learning models can produce correct outcomes in some instances, and in other instances when noise (e.g., via perturbing) has been introduced, the deep learning and machine learning models can produce incorrect outcomes. Such deep learning and machine learning models are not considered to be robust.

Thus, it can be desirable to evaluate the robustness of such a model/system; and additionally, to test the model/system prior to deployment. It can further be desirable to generate test cases to understand the behavior in which situations where the deep learning or machine learning model fails to produce correct outcomes.

Further, it can be challenging to test models where the model includes multiple models connected in series; where the output of one network is fed into another network to generate a final output. The multiple models can comprise a cascade of a variety of deep learning and machine learning models. For example and without limitation, modern voice enabled chatbot systems can contain a cascade of Speech-to-text models and Text Intent Classifiers for evaluation.

Nonetheless, even though results can be provided, a problem associated with deep learning model and machine learning model testing systems and methods, is that they lack the robustness to view the multiple models as a single cascaded pipeline. Given these problems, one or more embodiments described herein can be implemented to produce a solution to one or more of these problems in the form of systems, computer-implemented methods, and/or computer program products that can facilitate the following processes: i) generating, using a processor operatively coupled to memory, a test case associated with a label from labeled speech data represented by waveform; ii) feeding, using the processor, the test case to a cascaded pipeline to obtain an output of the cascaded pipeline; and iii) testing, using the processor, a robustness of the cascaded pipeline by comparing the output of the cascaded pipeline and the label. That is, embodiments described herein include one or more systems, computer implemented methods, apparatuses and/or computer program products that can facilitate one or more of the aforementioned processes.

FIG. 1 illustrates a block diagram of an example, non-limiting system 100 that comprises an input component 102, a cascaded pipeline 104, an evaluation component 106, and a perturbing component 108. Additionally, the input component 102 can receive a test case associated with a label form labeled speech data represented by waveform. The evaluation component 106 can feed the test case to the cascaded pipeline 104 to obtain an output of the cascaded pipeline 104. The evaluation component 106 can evaluate a robustness of the cascaded pipeline 104 by comparing the output of the cascaded pipeline 104 and the label. Further, the cascaded pipeline 104 can comprise a first model and a second model. The first model can be a speech-to-text model; and the second model can be a text intent classification model. With examples, the system 100 can include a perturbing component 108 that can generate the test case by adding noise to a sample from the labeled speech data. The noise added to the sample can be of such a degree that the output of the cascaded pipeline 104 is different from the label.

In embodiments, the perturbing component 108 can generate a magnitude spectrum from the test case and can add the noise to the magnitude spectrum. Further, the perturbing component 108 can reconstruct the test case via a spectrogram representation. Repetitive description of like elements employed in other embodiments described herein is omitted for sake of brevity. Aspects of systems (e.g., the cascaded deep learning pipeline testing system 100 and the like), apparatuses or processes in various embodiments of the present invention can constitute one or more machine-executable components embodied within one or more machines (e.g., embodied in one or more computer readable mediums (or media) associated with one or more machines). Such components, when executed by the one or more machines (e.g., computers, computing devices, virtual machines, a combination thereof, and/or the like) can cause the machines to perform the operations described.

Additional description of functionalities will be further described below with reference to the example embodiments of FIGS. 1 and 2, where repetitive description of like elements and/or processes employed in respective embodiments is omitted for sake of brevity. The cascaded deep learning pipeline testing system 100 can facilitate: i) generating, using a processor 122 operatively coupled to memory, a test case associated with a label from labeled speech data represented by waveform; ii) feeding, using the processor 122, the test case to a cascaded pipeline 104 to obtain an output; and iii) testing, using the processor 122, a robustness of the cascaded pipeline by comparing the output of the cascaded pipeline and the label. Additionally, the system 100 can facilitate, generating, using the processor 122, the test case by adding noise to a sample from the labeled speech data; and further, the noise added to the sample can be of such a degree that the output of the cascaded pipeline is different from the label.

Figure 8:
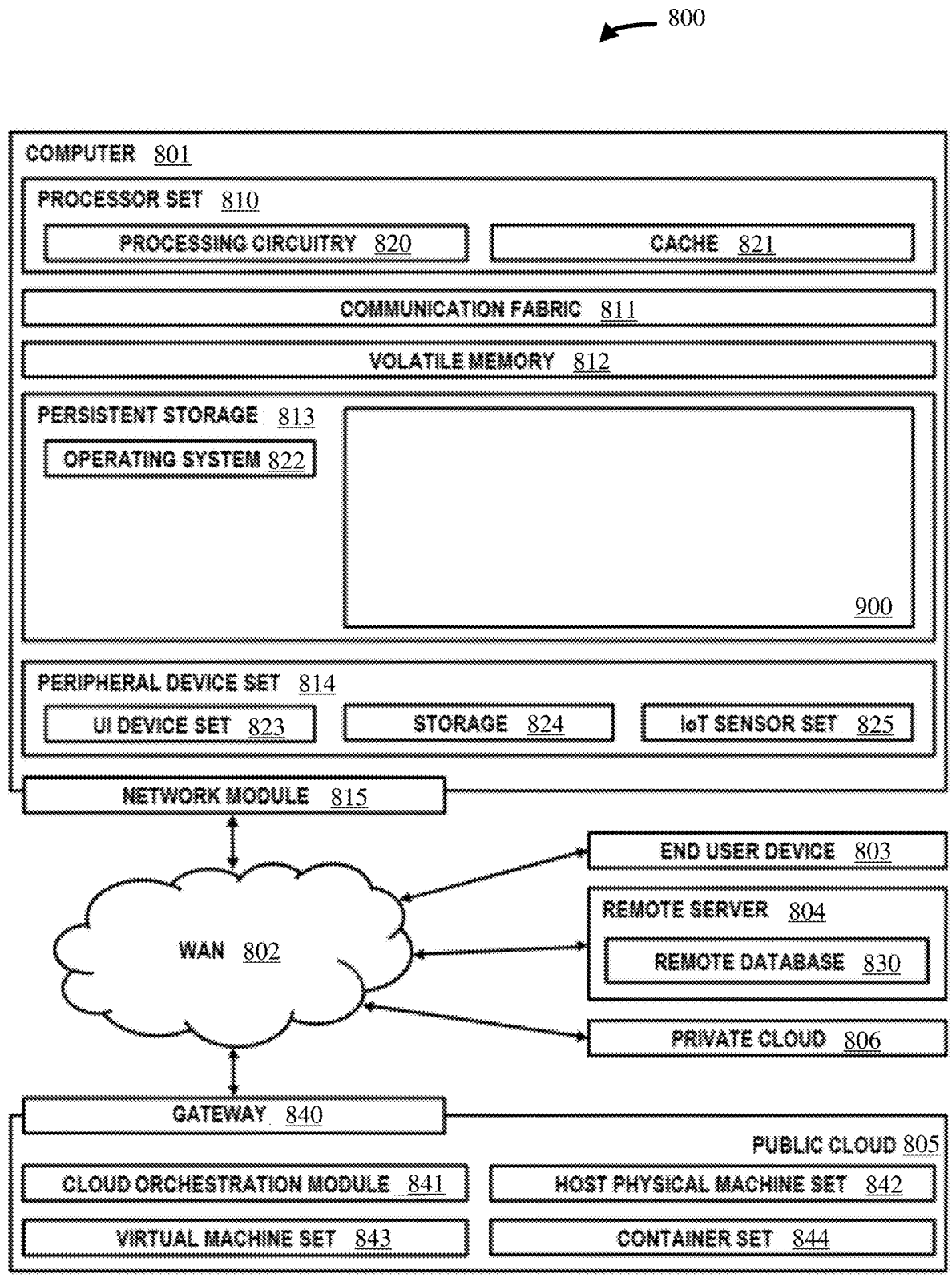
FIG. 8 illustrates a block diagram of an example, non-limiting operating environment in which one or more embodiments described herein can be facilitated.

The input component 102 can be operatively linked with the cascaded pipeline 104, the evaluation component 106, and the perturbing component 108 such as to evaluate the robustness of the cascaded deep learning pipeline 104. The cascaded deep learning pipeline testing system 100 can be connected with a system bus 120, a processor 122, a memory/storage component 124, one or more networks 130, one or more input devices 132, and one or more computer application 134, which can be associated with cloud computing environment 800 (FIG. 8).

Figure 2:
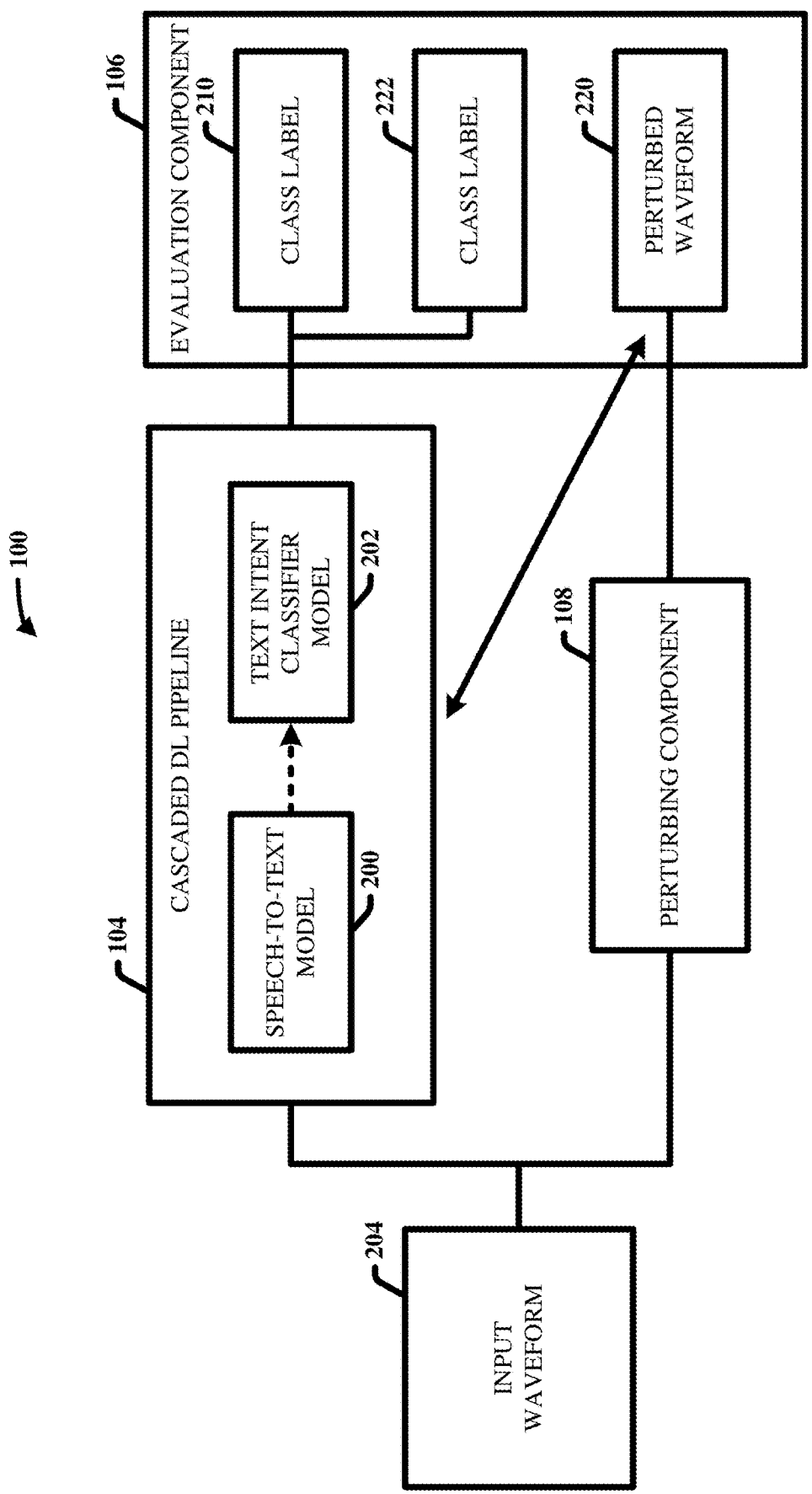
FIG. 2 illustrates a block diagram of an example, non-limiting cascaded deep learning pipeline testing system, in accordance with one or more embodiments described herein.

In embodiments, such as generally illustrated in FIGS. 1 and 2, the cascaded deep learning pipeline testing system 100 can facilitate the testing of a cascaded deep learning pipeline 104 (e.g., a deep learning model) that can be composed of multiple models. For example, the cascaded deep learning pipeline 104 can include one or more of a variety of models connected in series. In further examples, the cascaded deep learning pipeline 104 can include a first model 200 and a second model 202. The first model 200 can be connected in series with the second model 202 such that the output of the first model 200 (e.g., a first network) can be fed into the second model 202 (e.g., a second network). Additionally, the one or more various models of the cascaded deep learning pipeline 104 can be a combination of one or more individual black box systems. With examples, the system 100 can view the cascaded deep learning pipeline 104 as a single system (e.g., a single cascaded pipeline)

With embodiments, such as generally illustrated in FIG. 2, the first model 200 can be a Speech-to-Text model, and the second model 202 can be a Text Intent Classifier model. Further, the cascaded deep learning pipeline 104 can receive an input and can generate an output. The input to the cascaded deep learning pipeline 104 can include an input waveform 204 (e.g., a test case). The input waveform 204 can be a voice segment, a speech segment, an audio sample, voice note, or the like in waveform. The cascaded deep learning pipeline 104 can receive the input waveform 204 (e.g., via the input component 102) and can process the input waveform 204 using the first model 200 (e.g., the Speech-to-Text model).

In embodiments, the first model 200 can convert/transcribe the detected speech of the input waveform 204 to a textual representation. Further, the output (e.g., the textual representation) of the first model 200 can be fed (e.g., via a series connection) into the second model 202. The second model 202 can determine a text intent of the input waveform 204; and additionally, can generate a class label 210 associated with the text intent for the particular text (e.g., the input waveform 204). The class label 210 can be one or more of a variety of text intents. For example and without limitation, the second model 202 can assign a class label 210 identifying a fragment, a statement, a request, a question, a command, a rhetorical question, a rhetorical command, and/or an intonation-dependent utterance (e.g., among other varieties of langue based intent).

With embodiments, the input waveform 204 can be fed into the perturbing component 108. The perturbing component 108 can receive the input waveform 204 from one or more of a variety of sources (e.g., such as via the input component 102). The perturbing component 108 can perturb the input waveform 204 to generate a perturbed waveform 220. The perturbing component 108 can generate/select noise to add to the original input waveform 204. Such noise can include one or more of a variety of audio interferences (e.g., a tone, a voice segment, etc.) to interfere with the ability of the cascaded pipeline 104 to accurately determine the class label 222. The non-limiting cascaded deep learning pipeline testing system 100 can feed/transmit the perturbed waveform 220 to the cascaded pipeline 104 for interpretation. In examples, the class label 210 associated with the input waveform 204 can be compared and/or evaluated in relation to the class label 222 associated with the perturbed waveform 220 (e.g., in assessing the robustness of the cascaded pipeline 104).

Figure 3:
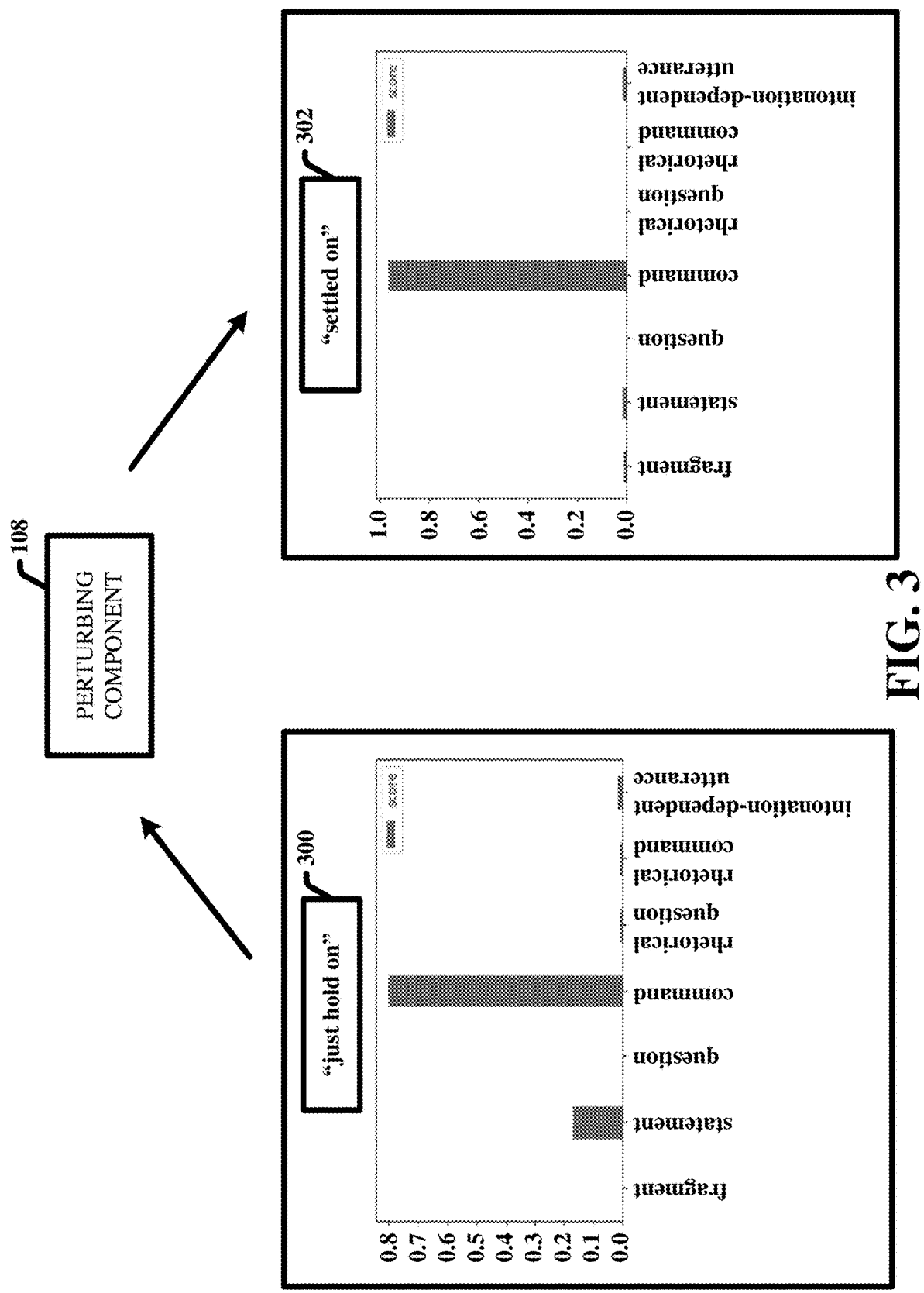
FIG. 3 illustrates a block diagram of an example, non-limiting cascaded deep learning pipeline testing system that can facilitate perturbing an input waveform to generate a perturbed waveform, in accordance with one or more embodiments described herein.
Figure 4:
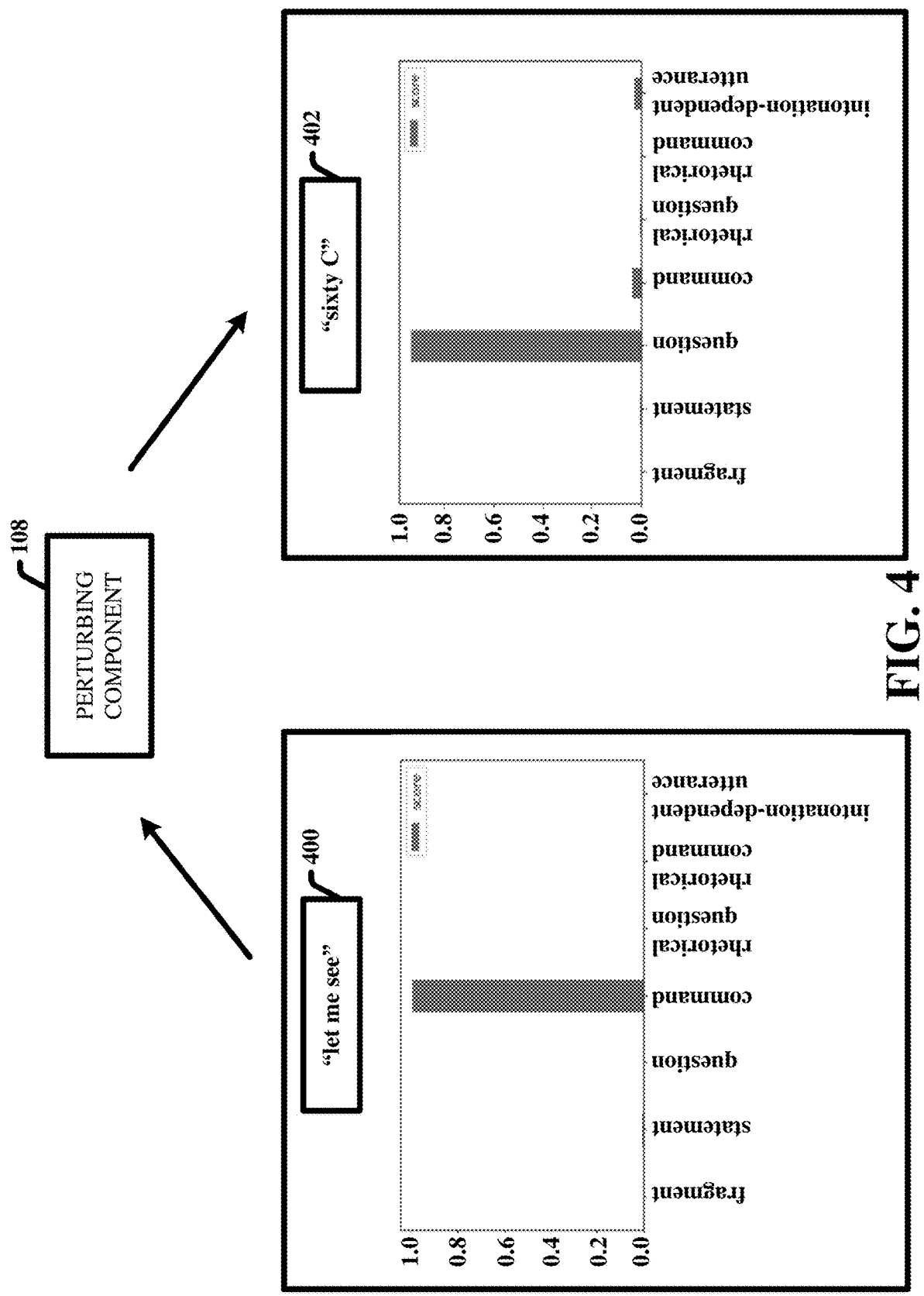
FIG. 4 illustrates a block diagram of an example, non-limiting cascaded deep learning pipeline testing system that can facilitate perturbing an input waveform to generate a perturbed waveform, in accordance with one or more embodiments described herein.

In embodiments, such as generally shown in FIGS. 2, 3, and 4, the perturbing component 108 can alter and/or change the input waveform 204 by adding noise. Noise can be added to the input waveform 204 (in generating the perturbed waveform 220) such that the Speech-to-Text model 200 and the Text Intent Classifier model 202 produce different results (e.g., text and class tag data) in comparison to the results obtained when processing the original input waveform 204.

With embodiments, such as generally shown in FIG. 3, the original input waveform 204 can be transmitted (e.g., via the evaluation component 106) to the perturbing component 108 to generate a perturbed waveform 220. The cascaded pipeline 104 can receive the input waveform 204 and can generate a text representation 300; for example, including the phrase "just hold on". Further, the Speech-to-Text model 200 can generate the text representation 300 for the input waveform 204 and can transmit the text representation 300 to the Text Intent Classifier model 202 for classification. Such as generally illustrated in FIG. 3, the Text Intent Classifier model 202 can generate one or more class labels/tags for the original input waveform 204. For example, for the text representation 300, "just hold on", the Text Intent Classifier model 202 can assign/generate a statement class label, a command class label, a rhetorical question class label, a rhetorical command class label, and an intonation-dependent utterance class label. One or more class labels can include one or more varying weights associated with an accuracy/confidence threshold.

In embodiments, the perturbing component 108 can add noise to the input waveform 204 such that the Speech-to-Text model 200 generates a different resulting text representation 302. For example and without limitation, the input waveform 204 can be perturbed such as to cause the Speech-to-Text model 200 to generate the text representation 302 including the phrase "settled on" which is different than the text representation 300 including the phrase "just hold on". The Speech-to-Text model 200 (e.g., and in some instances the evaluation component 106) can transmit the text representation 302 to the Text Intent Classifier model 202 to generate one or more class labels for the perturbed waveform 220. For example, for the text representation 302, "settled on", the Text Intent Classifier model 202 can assign/generate a fragment class label, a statement class label, command class label, and an intonation-dependent utterance class label. Such as can be generally seen by FIG. 3, the original input waveform 204 and the perturbed waveform 220 can generate a same or similar collection/dispersion of associated class labels (e.g., the most accurate class label being the command class label).

Turning next to FIG. 4, the cascaded pipeline 104 (e.g., the Speech-to-Text model 200 and the Text Intent Classifier model 202) can assign a different collection/dispersion of associated class labels for a perturbed waveform 220 in comparison to the same waveform prior to perturbation. The cascaded pipeline 104 can receive the input waveform 204 and can transmit the input waveform 204 to the Speech-to-Text model 200 to generate a text representation 400 including the phrase "let me see". Further, the Speech-to-Text model 200 can transmit (e.g., the evaluation component 106) the text representation 400 to the Text Intent Classifier model 202 for classification. For example, for the text representation 400, "let me see", the Text Intent Classifier model 202 can assign/generate a statement class label and a command class label.

In embodiments, the perturbing component 108 can add noise to the input waveform 204 such that the Speech-to-Text model 200 generates a different resulting text representation 402. For example and without limitation, the input waveform 204 can be perturbed such as to cause the Speech-to-Text model 200 to generate the text representation 402 including the phrase "sixty C" which is different than the text representation 400 including the phrase "let me see". The Speech-to-Text model 200 (e.g., the evaluation component 106) can transmit the text representation 402 to the Text Intent Classifier model 202 to generate one or more class labels for the perturbed waveform 220. For example, for the text representation 402, "sixty C", the Text Intent Classifier model 202 can assign/generate a statement class label, a question class label, a command class label, and an intonation-dependent class label. Such as can be seen in comparing the resulting class labels for the text representations 400, 402, the text representation 400 including the phrase "let me see" generated a command class tag (e.g., with acceptable precision) and the text representation 402 including the phrase "sixty C" generated a question class tag. Further, the original input waveform 204 can be perturbed such as to generate different class labels resulting in different actions carried about from systems connected to the cascaded pipeline 104.

Figure 5:
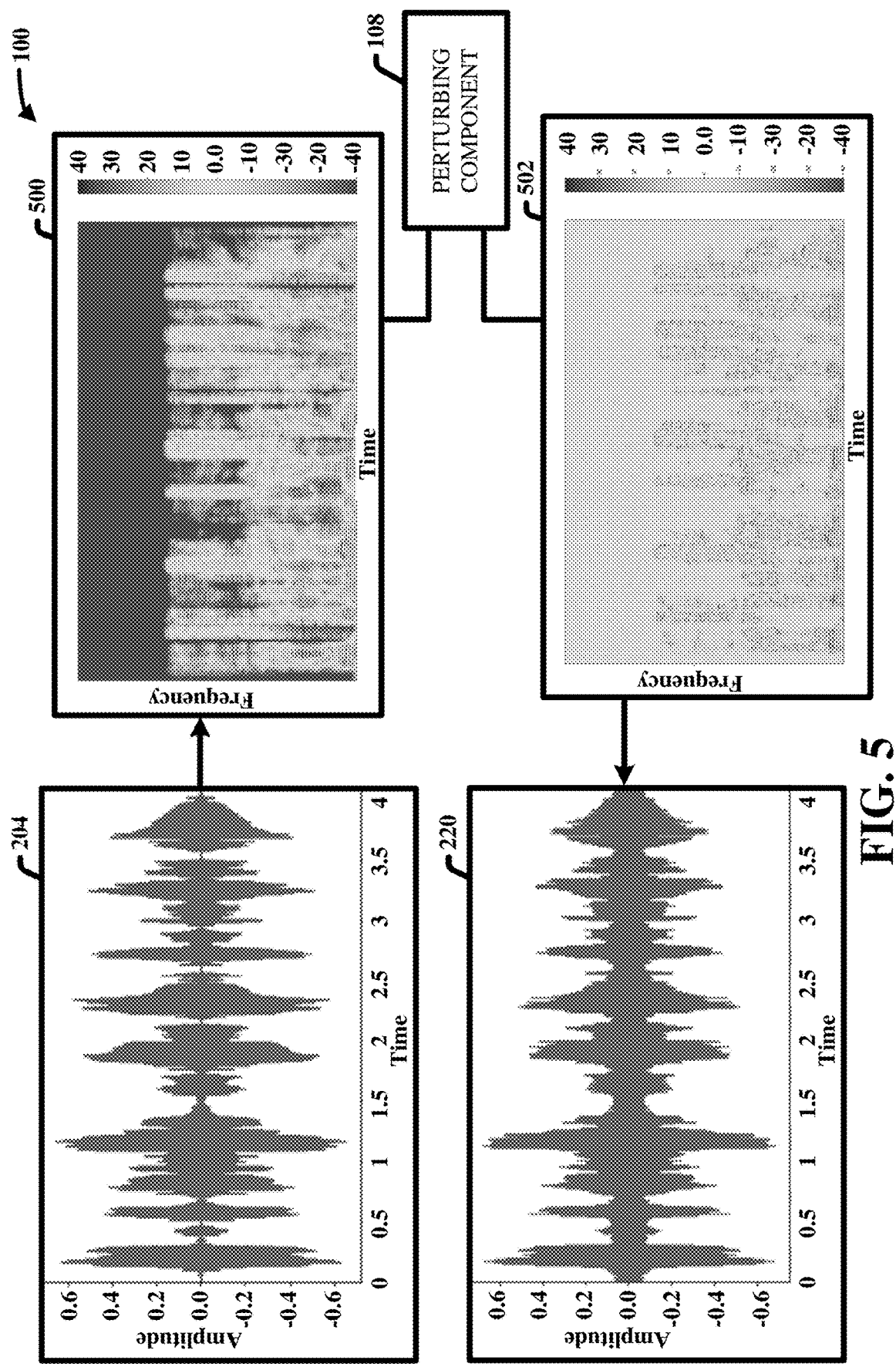
FIG. 5 illustrates a block diagram of an example, non-limiting cascaded deep learning pipeline testing system that can facilitate perturbing an input waveform to generate a perturbed waveform, in accordance with one or more embodiments described herein.

With embodiments, such as generally illustrated in FIG. 5, the perturbing component 108 (e.g., the evaluation component 106) can add noise to the original input waveform 204 to generate the perturbed waveform 220. The evaluation component 106 can transform the input waveform 204 to a spectrogram representation 500 so that the perturbing component 108 can add noise to the spectrogram representation 500 before transforming back into the waveform format (e.g., the perturbed waveform 220). The perturbing component 108 can generate a noisy spectrogram representation 502 from applying noise to the spectrogram representation 500 of the input waveform 204.

Additionally, the perturbing component 108 (e.g., the evaluation component 106) can reconstruct a waveform from the noisy spectrogram representation 502. Further, the perturbing component 108 can transform the noisy spectrogram representation 502 into the perturbed waveform 220. The perturbed waveform 220 can be fed into the cascaded pipeline 104 to generate one or more class labels (in a similar manner, the input waveform 204 can be fed into the cascaded pipeline 104 for a comparison of results) to evaluate a robustness of the cascaded pipeline 104. Further, the perturbing component 108 can perturb the input waveform 220 in such a manner that the output of the cascaded pipeline 104 can be substantially likely to change.

In embodiments, the perturbing component 108 can perturb the input waveform 204 to generate the perturbed waveform 220. The input waveform 204 can be expressed as $x_i$, the output of the Speech-to-Text model 200 can be expressed as $g(x; \theta)$, and the output of the Text Intent Classifier model 202 can be expressed as $f(g(x;\theta); \varphi)$. The Speech-to-Text model 200 can generate an intent $y_i$ for the input $x_i$, which can be represented as $(x_i, y_i)$. The non-limiting cascaded deep learning pipeline testing system 100 can generate a perturbed waveform x' such that $f(g(x';\theta); \varphi) \neq y_i$. Further, the perturbed waveform 220 can include one or more of a variety of characteristics and/or constraints. In examples, the perturbed waveform 220 can include content preservation, can be goal driven, and can be plausible. Content preservation can be achieved with an input $x_i$ and perturbed input y; that are substantially similar. For example, after adding noise to the input waveform 220, the changes to the original waveform can be imperceptible (e.g., or partially imperceptible). In embodiments, the perturbed waveform 220 can include an additional tone or humming. A goal driven (e.g., targeted) perturbed waveform 220 can be generated such as to generate a different resulting collection of one or more class labels than that of the original input waveform 220 (which can be seen in FIG. 4). Additionally, the perturbed waveform 220 can result in a plausible output from the Speech-to-Text model 200 (e.g., the output is transcribable). Further, the perturbing component 108 can generate perturbations δ such that $f(g(x+\delta;\theta); \varphi) \neq y_i$.

With embodiments, such as illustrated in FIGS. 5 and 6, the perturbing component 108 can generate a spectrogram representation 500 which can be expressed as m(x). The spectrogram representation 500 can be an invertible transformation. Further, the spectrogram representation 500 can be a magnitude representation optimized in space to facilitate low-dimensional operations (e.g., transformations and noise additions) as demonstrated by the perturbing algorithm 600 of FIG. 6. The evaluation component 106 and/or the perturbing component 108 can utilize probability models and algorithms to determine the most probable class labels for a waveform. The objective of the perturbing algorithm 600 can be to reduce a gap between a probability (e.g., via a probability vector) of a best class label (the most probable label) and the next class label. The perturbing algorithm 600 can utilize Bayesian inference methods in determining the perturbation which can correlate to a different collection of assigned class labels. If the difference between the best class and a targeted class (which can be determined by the algorithm 600 or user) becomes small, such can indicate that the class label will not change after perturbation. Further, if the difference between the best class and a targeted class is negative, such can indicate that proposed perturbations (e.g., by the algorithm 600) can cause different class labels to be assigned. The evaluation component 106, the perturbing component 108, and the perturbing algorithm 600 can apply data optimization to utilize the cascaded pipeline 104 in a black-box manner (e.g., and the models thereof).

In embodiments, a computer-implemented method of testing a cascaded pipeline 700 can comprise a first step of generating, using the processor 122 operatively coupled to memory 124, a test case (the perturbed waveform 220) associated with a class label from labeled speech data represented by waveform (step 702). The perturbed waveform 220 can be generated by the processor 122 and/or the perturbing component 108 and can be fed to a cascaded pipeline 104 to obtain an output (e.g., one or more class labels) (step 704). Further, the method 700 can comprise testing, using the processor 122, the test case (e.g., the perturbed waveform 220) by comparing the output of the cascaded pipeline 104 (e.g., one or more class labels associated with processing the perturbed waveform) and the original class label of the input waveform 204 (e.g., one or more class labels associated with processing the waveform prior to perturbation) (step 706).

Figure 7:
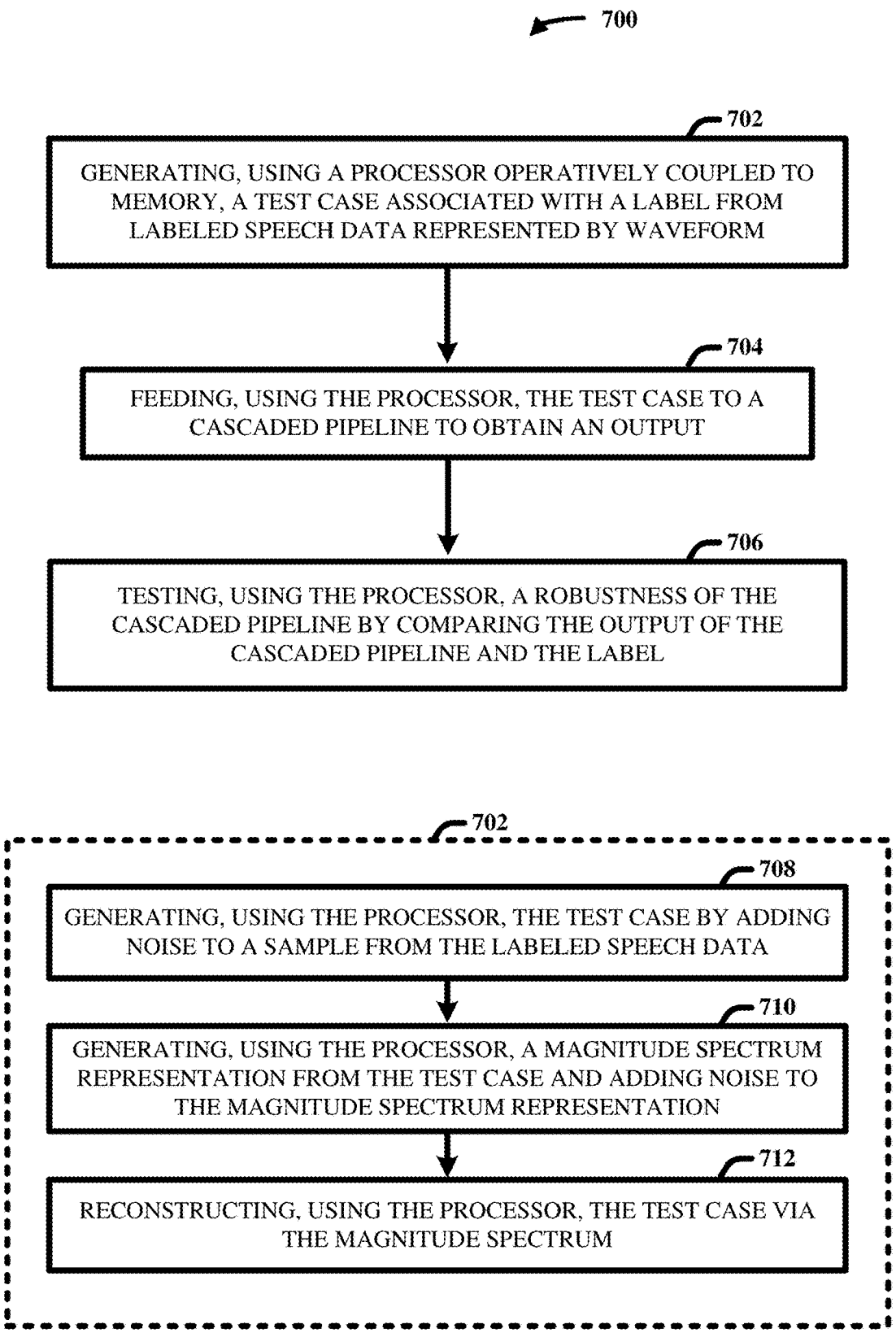
FIG. 7 illustrates a flow diagram of an example, non-limiting computer implemented method that can facilitate testing a cascaded deep learning pipeline, in accordance with one or more embodiments described herein.

Further, as illustrated in FIG. 7, the step of generating the perturbed waveform 220 (e.g., test case) can comprise one or more additional steps. With examples, the computer-implemented method of testing a cascaded pipeline 700 can comprise generating, using the processor 122, the test case (e.g., the perturbed waveform 220) by adding noise to a sample (e.g., the input waveform 204) from the labeled speech data (step 708). The computer-implemented method of testing a cascaded pipeline 700 can comprise generating, using the processor 122, a magnitude spectrum representation 500 from the test case and adding noise to the magnitude spectrum representation 502 (step 710). The method 700 can include transforming the input waveform 204 and the perturbed waveform 220 from a high-dimensional space to a low-dimensional space via a magnitude spectrum (e.g., thus generating magnitude spectrum representations for processing and analysis). Additionally, the computer implemented method of testing a cascaded pipeline 700 can include reconstructing, using the processor 122, the test case (e.g., the perturbed waveform 220) in waveform via the magnitude spectrum representation (step 712). Further, the perturbed waveform 220 can then be fed, via the processor, into the cascaded pipeline 104, which can include one or more different models, including a Speech-to-Text model 200 and a Text Intent Classifier model 202.

For example, one or more embodiments described herein of the cascaded deep learning pipeline testing system 100 and/or one or more components thereof can employ one or more computing resources of the computing environment 800 described below with reference to the illustration 800 of FIG. 8. For instance, the system and/or components thereof can employ one or more classical and/or quantum computing resources to execute one or more classical and/or quantum: mathematical functions, calculations and/or equations; computing and/or processing scripts; algorithms; models (e.g., artificial intelligence (AI) models, machine learning (ML) models and/or like model); and/or another operation in accordance with one or more embodiments described herein.

It is to be understood that although one or more embodiments described herein include a detailed description on cloud computing, implementation of the teachings recited herein are not limited to a cloud computing environment. Rather, one or more embodiments described herein are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines and services) that can be rapidly provisioned and released with minimal management effort or interaction with a provider of the service. This cloud model can include at least five characteristics, at least three service models, and at least four deployment models. Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can be able to specify location at a higher level of abstraction (e.g., country, state or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth and active user accounts). Resource usage can be monitored, controlled and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage or individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems or storage, but has control over the deployed applications and possibly application hosting environment configurations.

Infrastructure as a Service (IaaS): the capability provided to the consumer is to provision processing, storage, networks and/or other fundamental computing resources where the consumer can deploy and run arbitrary software, which can include operating systems and applications. The consumer does not manage or control the underlying cloud infrastructure but has control over operating systems, storage, deployed applications and/or possibly limited control of select networking components (e.g., host firewalls).

A cloud computing environment is service oriented with a focus on statelessness, low coupling, modularity and/or semantic interoperability. At the heart of cloud computing is an infrastructure that includes a network of interconnected nodes.

Moreover, the cascaded deep learning pipeline testing system 100 can be associated with or be included in a data analytics system, a data processing system, a graph analytics system, a graph processing system, a big data system, a social network system, a speech recognition system, an image recognition system, a graphical modeling system, a bioinformatics system, a data compression system, an artificial intelligence system, an authentication system, a syntactic pattern recognition system, a medical system, a health monitoring system, a network system, a computer network system, a communication system, a router system, a server system, a high availability server system (e.g., a Telecom server system), a Web server system, a file server system, a data server system, a disk array system, a powered insertion board system, a cloud-based system or the like. In accordance therewith, the cascaded deep learning pipeline testing system 100 can be employed to use hardware and/or software to solve problems that are highly technical in nature, that are not abstract and/or that cannot be performed as a set of mental acts by a human.

It should be appreciated that the embodiments depicted in various figures disclosed herein are for illustration only, and as such, the architecture of embodiments is not limited to the systems, devices and/or components depicted therein, nor to any particular order, connection and/or coupling of systems, devices and/or components depicted therein. For example, in some embodiments, the cascaded deep learning pipeline testing system 100 can further comprise various computer and/or computing-based elements described herein with reference to computing environment 800 and FIG. 8. In several embodiments, computer and/or computing-based elements can be used in connection with implementing one or more of the systems, devices, components and/or computer-implemented operations shown and described in connection with FIG. 1 or with other figures disclosed herein.

Memory 124 can store one or more computer and/or machine readable, writable and/or executable components and/or instructions that, when executed by processor 122 (e.g., a classical processor, a quantum processor and/or like processor), can facilitate performance of operations defined by the executable component(s) and/or instruction(s). For example, memory 124 can store computer and/or machine readable, writable and/or executable components and/or instructions that, when executed by processor 122, can facilitate execution of the various functions described herein relating to the input component 102, the cascaded pipeline 104, the evaluation component 106, the perturbing component 108, and/or another component associated with the cascaded deep learning pipeline testing system 100 as described herein with or without reference to the various figures of the one or more embodiments.

Memory 124 can comprise volatile memory (e.g., random access memory (RAM), static RAM (SRAM), dynamic RAM (DRAM) and/or the like) and/or non-volatile memory (e.g., read only memory (ROM), programmable ROM (PROM), electrically programmable ROM (EPROM), electrically erasable programmable ROM (EEPROM) and/or the like) that can employ one or more memory architectures. Further examples of memory 124 are described below with reference to system volatile memory 812 and FIG. 8. These examples of memory 124 can be employed to implement any one or more embodiments described herein.

Processor 122 can comprise one or more types of processors and/or electronic circuitry (e.g., a classical processor, a quantum processor and/or like processor) that can implement one or more computer and/or machine readable, writable and/or executable components and/or instructions that can be stored at memory 124. For example, processor 122 can perform various operations that can be specified by computer and/or machine readable, writable and/or executable components and/or instructions including, but not limited to, logic, control, input/output (I/O), arithmetic and/or the like. In some embodiments, processor 122 can comprise one or more central processing units, multi-core processors, microprocessors, dual microprocessors, microcontrollers, System on a Chip (SOCs), array processors, vector processors, quantum processors and/or another type of processor. Additional examples of processor 122 are described below with reference to processor set 810 and FIG. 8. The examples of processor 122 can be employed to implement any one or more embodiments described herein.

The cascaded deep learning pipeline testing system 100, the input component 102, the cascaded pipeline 104, the evaluation component 106, the perturbing component 108, the processor 122, the memory 124, and/or another component of system 100 as described herein can be communicatively, electrically, operatively and/or optically coupled to one another via system bus 120 to perform functions of system 100 and/or any components coupled therewith. System bus 120 can comprise one or more memory buses, memory controllers, peripheral buses, external buses, local buses, a quantum buses and/or another type of bus that can employ various bus architectures. The examples of system bus 120 can be employed to implement any one or more embodiments described herein.

The cascaded deep learning pipeline testing system 100 can comprise any type of component, machine, device, facility, apparatus and/or instrument that comprises a processor and/or can be capable of effective and/or operative communication with a wired and/or wireless network. All suitable such embodiments are envisioned. For example, the cascaded deep learning pipeline testing system 100 can comprise a server device, a computing device, a general-purpose computer, a special-purpose computer, a quantum computing device (e.g., a quantum computer), a tablet computing device, a handheld device, a server class computing machine and/or database, a laptop computer, a notebook computer, a desktop computer, a cell phone, a smart phone, a consumer appliance and/or instrumentation, an industrial and/or commercial device, a digital assistant, a multimedia Internet enabled phone, a multimedia players and/or another type of device.

The cascaded deep learning pipeline testing system 100 can be coupled (e.g., communicatively, electrically, operatively, optically and/or the like) to one or more external systems, sources and/or devices (e.g., classical and/or quantum computing devices, communication devices and/or the like) via a data cable (e.g., High-Definition Multimedia Interface (HDMI), recommended standard (RS) 232, Ethernet cable and/or the like). In some embodiments, the cascaded deep learning pipeline testing system 100 can be coupled (e.g., communicatively, electrically, operatively, optically and/or the like) to one or more external systems, sources and/or devices (e.g., classical and/or quantum computing devices, communication devices and/or the like) via a network.

In some embodiments, a network 130 can comprise one or more wired and/or wireless networks, including, but not limited to, a cellular network, a wide area network (WAN) (e.g., the Internet), or a local area network (LAN). For example, the cascaded deep learning pipeline testing system 100, the input component 102, the cascaded pipeline 104, the evaluation component 106, and/or the perturbing component 108, can communicate with one or more external systems, sources and/or devices, for instance, computing devices (and vice versa) using virtually any desired wired or wireless technology, including but not limited to: wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra-mobile broadband (UMB), high speed packet access (HSPA), Zigbee and other 802.XX wireless technologies and/or legacy telecommunication technologies, BLUETOOTH®, Session Initiation Protocol (SIP), ZIGBEE®, RF4CE protocol, WirelessHART protocol, 6LoWPAN (IPv6 over Low power Wireless Area Networks), Z-Wave, an ANT, an ultra-wideband (UWB) standard protocol and/or other proprietary and/or non-proprietary communication protocols. In a related example, the cascaded deep learning pipeline testing system 100 can include hardware (e.g., a central processing unit (CPU), a transceiver, a decoder, quantum hardware, a quantum processor and/or the like), software (e.g., a set of threads, a set of processes, software in execution, quantum pulse schedule, quantum circuit, quantum gates and/or the like) and/or a combination of hardware and software that facilitates communicating information among the cascaded deep learning pipeline testing system 100 and external systems, sources and/or devices (e.g., computing devices, communication devices and/or the like).

The cascaded deep learning pipeline testing system 100 can comprise one or more computer and/or machine readable, writable and/or executable components and/or instructions that, when executed by processor 122 (e.g., a classical processor, a quantum processor and/or the like), can facilitate performance of one or more operations defined by such component(s) and/or instruction(s). Further, in numerous embodiments, any component associated with the cascaded deep learning pipeline testing system 100, as described herein with or without reference to the various figures of the one or more embodiments, can comprise one or more computer and/or machine readable, writable and/or executable components and/or instructions that, when executed by processor 122, can facilitate performance of one or more operations defined by such component(s) and/or instruction(s). For example, the input component 102, the cascaded pipeline 104, the evaluation component 106, the perturbing component 108, and/or any other components associated with cascaded deep learning pipeline testing system 100 as disclosed herein (e.g., communicatively, electronically, operatively and/or optically coupled with and/or employed by system 100), can comprise such computer and/or machine readable, writable and/or executable component(s) and/or instruction(s). Consequently, according to numerous embodiments, cascaded deep learning pipeline testing system 100 and/or any components associated therewith as disclosed herein, can employ processor 122 to execute such computer and/or machine readable, writable and/or executable component(s) and/or instruction(s) to facilitate performance of one or more operations described herein with reference to system 100 and/or any such components associated therewith.

The cascaded deep learning pipeline testing system 100 can facilitate (e.g., via processor 122) performance of operations executed by and/or associated with the input component 102, the cascaded pipeline 104, the evaluation component 106, the perturbing component 108, and/or another component associated with system 100 as disclosed herein.

For instance, as described in detail below, the cascaded deep learning pipeline testing system 100 can facilitate via processor 122 (e.g., a classical processor, a quantum processor and/or the like): generating one or more language invariant signals; generating a complete query intent using the one or more language invariant signals; and/or processing the complete query intent to an executable backend query to facilitate multi-lingual query interpretation. As will be apparent from the below, one or more systems can be employed to facilitate zero-shot transfer of the one or more language invariant signals (e.g., such as to be independent of domain/ language specific training).

In embodiments, the cascaded deep learning pipeline testing system 100 can include one or more input components 102, one or more cascaded pipelines 104, one or more evaluation components 106, one or more perturbing components 108, one or more system buses 120, one or more processors 122, one or more memory/storage components 124, one or more networks 130, one or more input devices 132, and/or one or more computer applications 134. The input component 102, the cascaded pipeline 104, the evaluation component 106, and the perturbing component 108 can be connected with one or more machines comprised by the cascaded deep learning pipeline testing system 100. As used herein, the one or more machines can include one or more of a computing device, a general-purpose computer, a special-purpose computer, a quantum computing device (e.g., a quantum computer), a tablet computing device, a handheld device, a server class computing machine and/or database, a laptop computer, a notebook computer, a desktop computer, a cell phone, a smart phone, a consumer appliance and/or instrumentation, an industrial and/or commercial device, a digital assistant, a multimedia Internet enabled phone and/or another type of device.

Turning next to FIG. 8, the following discussion and associated figure are intended to provide a short general description of a suitable computing environment 800 in which one or more embodiments described herein at FIGS. 1-7B can be implemented. For example, various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 800 contains an example of an environment for the execution of at least some of the computer code involved in performing the inventive methods, such as cascaded deep learning pipeline testing code block 900. In addition to block 900, computing environment 800 includes, for example, computer 801, wide area network (WAN) 802, end user device (EUD) 803, remote server 804, public cloud 805, and private cloud 806. In this embodiment, computer 801 includes processor set 810 (including processing circuitry 820 and cache 821), communication fabric 811, volatile memory 812, persistent storage 813 (including operating system 822 and block 900, as identified above), peripheral device set 814 (including user interface (UI), device set 823, storage 824, and Internet of Things (IOT) sensor set 825), and network module 815. Remote server 804 includes remote database 830. Public cloud 805 includes gateway 840, cloud orchestration module 841, host physical machine set 842, virtual machine set 843, and container set 844.

COMPUTER 801 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 830. As is well understood in the art of computer technology, and depending upon the technology, performance of a computer-implemented method may be distributed among multiple computers and/or between multiple locations. On the other hand, in this presentation of computing environment 800, detailed discussion is focused on a single computer, specifically computer 801, to keep the presentation as simple as possible. Computer 801 may be located in a cloud, even though it is not shown in a cloud in FIG. 8. On the other hand, computer 801 is not required to be in a cloud except to any extent as may be affirmatively indicated.

PROCESSOR SET 810 includes one, or more, computer processors of any type now known or to be developed in the future. Processing circuitry 820 may be distributed over multiple packages, for example, multiple, coordinated integrated circuit chips. Processing circuitry 820 may implement multiple processor threads and/or multiple processor cores. Cache 821 is memory that is located in the processor chip package(s) and is typically used for data or code that should be available for rapid access by the threads or cores running on processor set 810. Cache memories are typically organized into multiple levels depending upon relative proximity to the processing circuitry. Alternatively, some, or all, of the cache for the processor set may be located "off chip." In some computing environments, processor set 810 may be designed for working with qubits and performing quantum computing.

Computer readable program instructions are typically loaded onto computer 801 to cause a series of operational steps to be performed by processor set 810 of computer 801 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 821 and the other storage media discussed below. The program instructions, and associated data, are accessed by processor set 810 to control and direct performance of the inventive methods. In computing environment 800, at least some of the instructions for performing the inventive methods may be stored in block 900 in persistent storage 813.

COMMUNICATION FABRIC 811 is the signal conduction paths that allow the various components of computer 801 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 812 is any type of volatile memory now known or to be developed in the future. Examples include dynamic type random access memory (RAM) or static type RAM. Typically, the volatile memory is characterized by random access, but this is not required unless affirmatively indicated. In computer 801, the volatile memory 812 is located in a single package and is internal to computer 801, but, alternatively or additionally, the volatile memory may be distributed over multiple packages and/or located externally with respect to computer 801.

PERSISTENT STORAGE 813 is any form of non-volatile storage for computers that is now known or to be developed in the future. The non-volatility of this storage means that the stored data is maintained regardless of whether power is being supplied to computer 801 and/or directly to persistent storage 813. Persistent storage 813 may be a read only memory (ROM), but typically at least a portion of the persistent storage allows writing of data, deletion of data and re-writing of data. Some familiar forms of persistent storage include magnetic disks and solid state storage devices. Operating system 822 may take several forms, such as various known proprietary operating systems or open source Portable Operating System Interface type operating systems that employ a kernel. The code included in block 900 typically includes at least some of the computer code involved in performing the inventive methods.

PERIPHERAL DEVICE SET 814 includes the set of peripheral devices of computer 801. Data communication connections between the peripheral devices and the other components of computer 801 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 823 may include components such as a display screen, speaker, microphone, wearable devices (such as goggles and smart watches), keyboard, mouse, printer, touchpad, game controllers, and haptic devices. Storage 824 is external storage, such as an external hard drive, or insertable storage, such as an SD card. Storage 824 may be persistent and/or volatile. In some embodiments, storage 824 may take the form of a quantum computing storage device for storing data in the form of qubits. In embodiments where computer 801 is required to have a large amount of storage (for example, where computer 801 locally stores and manages a large database) then this storage may be provided by peripheral storage devices designed for storing very large amounts of data, such as a storage area network (SAN) that is shared by multiple, geographically distributed computers. IoT sensor set 825 is made up of sensors that can be used in Internet of Things applications. For example, one sensor may be a thermometer and another sensor may be a motion detector.

NETWORK MODULE 815 is the collection of computer software, hardware, and firmware that allows computer 801 to communicate with other computers through WAN 802. Network module 815 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 815 are performed on the same physical hardware device. In other embodiments (for example, embodiments that utilize software-defined networking (SDN)), the control functions and the forwarding functions of network module 815 are performed on physically separate devices, such that the control functions manage several different network hardware devices. Computer readable program instructions for performing the inventive methods can typically be downloaded to computer 801 from an external computer or external storage device through a network adapter card or network interface included in network module 815.

WAN 802 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 803 is any computer system that is used and controlled by an end user (for example, a customer of an enterprise that operates computer 801), and may take any of the forms discussed above in connection with computer 801. EUD 803 typically receives helpful and useful data from the operations of computer 801. For example, in a hypothetical case where computer 801 is designed to provide a recommendation to an end user, this recommendation would typically be communicated from network module 815 of computer 801 through WAN 802 to EUD 803. In this way, EUD 803 can display, or otherwise present, the recommendation to an end user. In some embodiments, EUD 803 may be a client device, such as thin client, heavy client, mainframe computer, desktop computer and so on.

REMOTE SERVER 804 is any computer system that serves at least some data and/or functionality to computer 801. Remote server 804 may be controlled and used by the same entity that operates computer 801. Remote server 804 represents the machine(s) that collect and store helpful and useful data for use by other computers, such as computer 801. For example, in a hypothetical case where computer 801 is designed and programmed to provide a recommendation based on historical data, then this historical data may be provided to computer 801 from remote database 830 of remote server 804.

PUBLIC CLOUD 805 is any computer system available for use by multiple entities that provides on-demand availability of computer system resources and/or other computer capabilities, especially data storage (cloud storage) and computing power, without direct active management by the scale. The direct and active management of the computing resources of public cloud 805 is performed by the computer hardware and/or software of cloud orchestration module 841. The computing resources provided by public cloud 805 are typically implemented by virtual computing environments that run on various computers making up the computers of host physical machine set 842, which is the universe of physical computers in and/or available to public cloud 805. The virtual computing environments (VCEs) typically take the form of virtual machines from virtual machine set 843 and/or containers from container set 844. It is understood that these VCEs may be stored as images and may be transferred among and between the various physical machine hosts, either as images or after instantiation of the VCE. Cloud orchestration module 841 manages the transfer and storage of images, deploys new instantiations of VCEs and manages active instantiations of VCE deployments. Gateway 840 is the collection of computer software, hardware, and firmware that allows public cloud 805 to communicate through WAN 802.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 806 is similar to public cloud 805, except that the computing resources are only available for use by a single enterprise. While private cloud 806 is depicted as being in communication with WAN 802, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 805 and private cloud 806 are both part of a larger hybrid cloud.

The embodiments described herein can be directed to one or more of a system, a method, an apparatus or a computer program product at any possible technical detail level of integration. The computer program product can include a computer readable storage medium (or media) having computer readable program instructions thereon for causing a processor to carry out aspects of the one or more embodiments described herein. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon or any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network or a wireless network. The network can comprise copper transmission cables, optical transmission fibers, wireless transmission, routers, firewalls, switches, gateway computers or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the one or more embodiments described herein can be assembler instructions, instruction-set-architecture (ISA) instructions, machine instructions, machine dependent instructions, microcode, firmware instructions, state-setting data, configuration data for integrated circuitry, or source code or object code written in any combination of one or more programming languages, including an object oriented programming language such as Smalltalk, C++ or the like, or procedural programming languages, such as the "C" programming language or similar programming languages. The computer readable program instructions can execute entirely on the user's computer, partly on the user's computer, as a stand-alone software package, partly on the user's computer or partly on a remote computer or entirely on the remote computer or server. In the latter scenario, the remote computer can be connected to the user's computer through any type of network, including a local area network (LAN)

or a wide area network (WAN), or the connection can be made to an external computer (for example, through the Internet using an Internet Service Provider). In one or more embodiments, electronic circuitry including, for example, programmable logic circuitry, field-programmable gate arrays (FPGA) or programmable logic arrays (PLA) can execute the computer readable program instructions by utilizing state information of the computer readable program instructions to personalize the electronic circuitry, in order to perform aspects of the one or more embodiments described herein.

Aspects of the one or more embodiments described herein are described herein with reference to flowchart illustrations or block diagrams of methods, apparatus (systems), and computer program products according to one or more embodiments described herein. It will be understood that each block of the flowchart illustrations or block diagrams, and combinations of blocks in the flowchart illustrations or block diagrams, can be implemented by computer readable program instructions. These computer readable program instructions can be provided to a processor of a general purpose computer, special purpose computer or other programmable data processing apparatus to produce a machine, such that the instructions, which execute via the processor of the computer or other programmable data processing apparatus, create means for implementing the functions/acts specified in the flowchart or block diagram block or blocks. These computer readable program instructions can also be stored in a computer readable storage medium that can direct a computer, a programmable data processing apparatus or other devices to function in a particular manner, such that the computer readable storage medium having instructions stored therein comprises an article of manufacture including instructions which implement aspects of the function/act specified in the flowchart or block diagram block or blocks. The computer readable program instructions can also be loaded onto a computer, other programmable data processing apparatus or other device to cause a series of operational acts to be performed on the computer, other programmable apparatus or other device to produce a computer implemented process, such that the instructions which execute on the computer, other programmable apparatus or other device implement the functions/acts specified in the flowchart or block diagram block or blocks.

The flowcharts and block diagrams in the figures illustrate the architecture, functionality, and operation of possible implementations of systems, computer-implementable methods or computer program products according to one or more embodiments described herein. In this regard, each block in the flowchart or block diagrams can represent a module, segment or portion of instructions, which comprises one or more executable instructions for implementing the specified logical function(s). In one or more alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer or computers, those skilled in the art will recognize that the one or more embodiments herein also can be implemented in combination with other program modules. Generally, program modules include routines, programs, components, data structures or the like that perform particular tasks or implement particular abstract data types. Moreover, those skilled in the art will appreciate that the inventive computer-implemented methods can be practiced with other computer system configurations, including single-processor or multi-processor computer systems, mini-computing devices, mainframe computers, as well as computers, hand-held computing devices (e.g., PDA, phone), microprocessor-based or programmable consumer or industrial electronics or the like. The illustrated aspects can also be practiced in distributed computing environments in which tasks are performed by remote processing devices that are linked through a communications network. However, some, if not all aspects of the one or more embodiments can be practiced on stand-alone computers. In a distributed computing environment, program modules can be located in both local and remote memory storage devices.

As used in this application, the terms "component," "system," "platform," "interface," or the like, can refer to or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program or a computer. By way of illustration, both an application running on a server and the server can be a component. One or more components can reside within a process or thread of execution and a component can be localized on one computer or distributed between two or more computers. In another example, respective components can execute from various computer readable media having various data structures stored thereon. The components can communicate via local or remote processes such as in accordance with a signal having one or more data packets (e.g., data from one component interacting with another component in a local system, distributed system or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, where the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units.

Herein, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory or memory components described herein can be either volatile memory or nonvolatile memory or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM) or Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing the one or more embodiments, but one of ordinary skill in the art can recognize that many further combinations and permutations of the one or more embodiments are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the one or more embodiments provided herein have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system comprising:
   a memory that stores computer executable components; and
   a processor that executes at least one of the computer executable components that:
      receives a first test case for testing a cascaded pipeline comprising a speech-to-text model connected in series to an intent classification model, wherein the first test case comprises:
         an original waveform representing audio speech data, and
         wherein the speech-to-text model generates a first text output from the original waveform, and wherein the intent classification model generates a first intent classification from the first text output;
      generating a second test case for testing the cascaded pipeline, wherein the generating comprises:
         perturbing the original waveform to generate a perturbed waveform, wherein the perturbing comprises:
            adding noise to the original waveform in compliance with a set of constraints, wherein the set of constraints comprise:
               the perturbed waveform preserves content similarity to the original waveform according to a first defined criterion,
               the speech-to-text model generates a second text output from the perturbed waveform, wherein the second text output is different from the first text output, and the second text output is plausible according to a second defined criterion, and
               the intent classification model generates a second intent classification from the second text output, wherein the second intent classification is expected to be different from the first intent classification according to a probability model;
      feeds the second test case to the cascaded pipeline to obtain the second intent classification; and
      determines whether the second intent classification is different from the first intent classification to test the cascaded pipeline.

2. The system of claim 1, wherein the noise comprises a tone interference.

3. The system of claim 1, wherein the noise comprises a voice segment interference.

4. The system of claim 1, wherein the first defined criterion comprises adding at least one of a tone or a humming.

5. The system of claim 1, wherein the second defined criterion comprises the second text output being transcribable.

6. The system of claim 1, wherein the perturbing the original waveform comprises:
    generating a magnitude spectrum from the original waveform; and
    adding the noise to the magnitude spectrum to generate a noisy magnitude spectrum.

7. The system of claim 6, wherein the perturbing the original waveform further comprises:
    generating the perturbed waveform from the noisy magnitude spectrum.

8. A computer implemented method, comprising:
    obtaining, by a system comprising a processor, a first test case for testing a cascaded pipeline comprising a speech-to-text model connected in series to an intent classification model, wherein the first test case comprises:
        an original waveform representing audio speech data, and
        wherein the speech-to-text model generates a first text output from the original waveform, and wherein the intent classification model generates a first intent classification from the first text output;
    generating, by the system, a second test case for testing the cascaded pipeline, wherein the generating comprises:
        perturbing the original waveform to generate a perturbed waveform, wherein the perturbing comprises:
            adding noise to the original waveform in compliance with a set of constraints, wherein the set of constraints comprise:
                the perturbed waveform preserves content similarity to the original waveform according to a first defined criterion,
                the speech-to-text model generates a second text output from the perturbed waveform, wherein the second text output is different from the first text output, and the second text output is plausible according to a second defined criterion, and
                the intent classification model generates a second intent classification from the second text output, wherein the second intent classification is expected to be different from the first intent classification according to a probability model;
        feeding, by the system, the second test case to the cascaded pipeline to obtain the second intent classification; and
        testing, by the system, the cascaded pipeline by determining whether the second intent classification is different from the first intent classification.

9. The computer implemented method of claim 8, wherein the noise comprises a tone interference.

10. The computer implemented method of claim 8, wherein the noise comprises a voice segment interference.

11. The computer implemented method of claim 8, wherein the first defined criterion comprises adding at least one of a tone or a humming.

12. The computer implemented method of claim 8, wherein the second defined criterion comprises the second text output being transcribable.

13. The computer implemented method of claim 8, wherein the perturbing the original waveform comprises:
    generating a magnitude spectrum from the original waveform; and
    adding the noise to the magnitude spectrum to generate a noisy magnitude spectrum.

14. The computer implemented method of claim 13, wherein the perturbing the original waveform further comprises:
    generating the perturbed waveform from the noisy magnitude spectrum.

15. A computer program product for testing a cascaded pipeline, the computer program product comprising a computer readable storage medium having program instructions embodied therewith, the program instructions executable by a processor to cause the processor to:
    obtain a first test case for testing the cascaded pipeline comprising a speech-to-text model connected in series to an intent classification model, wherein the first test case comprises:
        an original waveform representing audio speech data, and
        wherein the speech-to-text model generates a first text output from the original waveform, and wherein the intent classification model generates a first intent classification from the first text output;
    generate a second test case for testing the cascaded pipeline, wherein the generating comprises:
        perturbing the original waveform to generate a perturbed waveform, wherein the perturbing comprises:
            adding noise to the original waveform in compliance with a set of constraints, wherein the set of constraints comprise:
                the perturbed waveform preserves content similarity to the original waveform according to a first defined criterion,
                the speech-to-text model generates a second text output from the perturbed waveform, wherein the second text output is different from the first text output, and the second text output is plausible according to a second defined criterion, and
                the intent classification model generates a second intent classification from the second text output, wherein the second intent classification is expected to be different from the first intent classification according to a probability model;
    feed the second test case to the cascaded pipeline to obtain the second intent classification; and
    test the cascaded pipeline by determining whether the second intent classification is different from the first intent classification.

16. The computer program product of claim 15, wherein the noise comprises a tone interference.

17. The computer program product of claim 15, wherein the first defined criterion comprises adding at least one of a tone or a humming.

18. The computer program product of claim 15, wherein the second defined criterion comprises the second text output being transcribable.

19. The computer program product of claim 15, wherein the perturbing the original waveform comprises:
    generating a magnitude spectrum from the original waveform; and
    adding the noise to the magnitude spectrum to generate a noisy magnitude spectrum.

20. The computer program product of claim 19, wherein the perturbing the original waveform further comprises:

generating the perturbed waveform from the noisy magnitude spectrum.

\* \* \* \* \*